United States Patent [19]

Müller et al.

[11] Patent Number: 4,460,391
[45] Date of Patent: Jul. 17, 1984

[54] CENTRIFUGAL-CHAMBER SEPARATING APPARATUS

[75] Inventors: Friedrich E. Müller, Eisdorf; G. Wolfgang Oesterwind, Osterode; Jürgen Nothdurft, Clausthal-Zellerfeld, all of Fed. Rep. of Germany

[73] Assignee: Anton Piller GmbH & Co. KG, Fed. Rep. of Germany

[21] Appl. No.: 345,015

[22] Filed: Feb. 2, 1982

[30] Foreign Application Priority Data

Feb. 5, 1981 [DE] Fed. Rep. of Germany ....... 3103842

[51] Int. Cl.³ ............................................. B01D 45/12
[52] U.S. Cl. ....................................... 55/343; 55/346; 55/349; 55/461
[58] Field of Search .................. 55/343, 344, 345, 346, 55/349, 454, 461; 209/144

[56] References Cited

U.S. PATENT DOCUMENTS

| | | | |
|---|---|---|---|
| 535,099 | 3/1895 | Gale et al. | 55/461 X |
| 1,660,685 | 2/1928 | Stebbins | 209/144 |
| 2,360,355 | 10/1944 | McBride et al. | 55/346 X |
| 2,818,935 | 1/1958 | Kemmetmuller | 55/348 X |
| 3,890,124 | 6/1975 | Howes | 55/346 |
| 3,948,771 | 4/1976 | Bielefeldt | 55/461 X |
| 4,001,121 | 1/1977 | Bielefeldt | 209/144 X |
| 4,298,359 | 11/1981 | Keller et al. | 55/349 X |

FOREIGN PATENT DOCUMENTS

| | | | |
|---|---|---|---|
| 228790 | 11/1910 | Fed. Rep. of Germany | 55/461 |
| 725711 | 4/1980 | U.S.S.R. | 55/345 |

*Primary Examiner*—Kathleen J. Prunner
*Attorney, Agent, or Firm*—Gottlieb, Rackman & Reisman

[57] ABSTRACT

The invention concerns a multistage centrifugal-chamber separator unit for separating solids from a gas stream. A plurality of parallel flow channels with centrifugal chambers connected to them are provided. Corresponding to the decrease of the flow volume, the total number of the centrifugal chambers in all the flow channels decreases in successive stages in the direction of flow. Transverse ducts which connect together the parallel flow channels are provided between stages with differing numbers of centrifugal chambers and are so designed that the flow channels of the following stage, reduced in number, are loaded equally by the gas stream. The separator unit has a plurality of identical structural elements which on one side have the configuration of the centrifugal chamber, including the trailing and leading edges. A plurality of separator units of this kind may be arranged parallel to one another in a housing.

5 Claims, 7 Drawing Figures

CENTRIFUGAL-CHAMBER SEPARATING APPARATUS

BACKGROUND OF THE INVENTION

The invention concerns an apparatus for separating solids suspended in a gas stream by means of centrifugal force, the separating apparatus having at least one separator unit which includes parallel flow channels, and a plurality of cylindrical centrifugal chambers, each of which in the concave region of the flow channel is open over a part of its wall area to the flow channel between a trailing edge and a blunt leading edge, and two outlet pipes in the centrifugal chamber, the outlet pipes being disposed coaxially in the centrifugal chambers, extending towards each other from the end walls of the chamber and connected to a purified gas outlet.

DESCRIPTION OF THE PRIOR ART

Separating apparatus of the foregoing type are distinguished in that a high degree of separation can be attained with them. With known multistage apparatus having a plurality of parallel flow channels (e.g., U.S. Pat. No. 4,001,121), the flow cross-sections of the flow channels and the dimensions of the centrifugal chambers diminish in the direction of flow. This entails a relatively large inactive structural volume and thereby a relatively large installation volume for a given performance. In addition the fabrication is complicated.

An object of the invention is to develop further a separating apparatus of the foregoing type which will have a very small installation volume for a given performance and can also be installed for the ventilation of vehicles and the like.

SUMMARY OF THE INVENTION

According to the invention, this problem is solved in that the total number of the centrifugal chambers of all the flow channels decreases in successive stages in the direction of flow and that between stages having differing numbers of centrifugal chambers transverse ducts are provided which join together the parallel flow channels and are so designed that the reduced number of centrifugal chambers in the following stage are acted on uniformly by the gas stream.

In the separating apparatus provided by the invention the configuration of all the centrifugal chambers in each separator unit may be designed to be substantially the same. In a specially advantageous form, the separator unit has a plurality of substantially identical structural elements, each having on one side the configuration of the concave region of the flow channels and on the other side of the configuration of the centrifugal chamber, including that of the trailing and leading edges. These structural elements may advantageously be disposed between two spaced apart panels in which the outlet pipes are mounted.

The flow channels after the last separator stage preferably issue into a common outlet channel through which the residual gas is conveyed together with all of the separated solids.

In a preferred form of the separator unit, a sealing flange is provided around the inlet region of the flow channels. The apparatus also includes an outer housing which has an inlet aperture and, immediately downstream of the inlet aperture, an inner partition on which the sealing flange of the separator unit can be applied, wherein the walls of the housing at least at its broad sides are situated at a distance from the panels forming the end walls of the centrifugal chambers and the housing is further provided with a purified gas outlet, and a residual gas outlet sealingly connected to the residual gas outlet duct of the separator unit. In a housing of this type several separator units can be arranged side-by-side with their broad sides situated parallel to each other and being supported by their sealing flanges on the partition, wherein the housing is provided with a sealing connection for the residual gas outlet duct for each separator unit. In this way by parallel connection of several separator units various outputs can be achieved.

BRIEF DESCRIPTION OF THE DRAWINGS

The invention is illustrated by way of example in the drawings and is described in detail with the aid of the drawings, in which.

DESCRIPTION OF THE PREFERRED EMBODIMENTS

Figure 1:
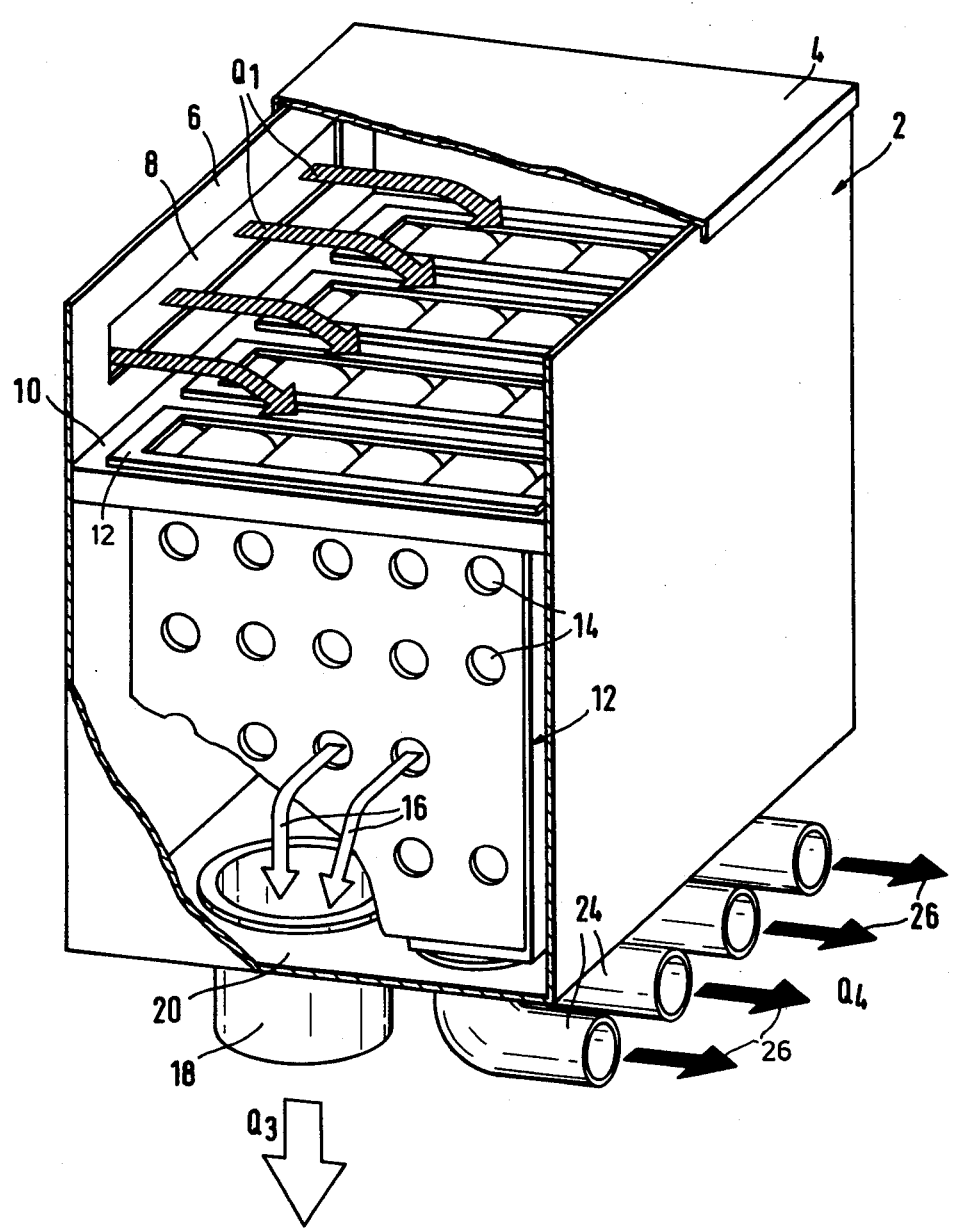
FIG. 1 is a partly-sectioned perspective view of a separating apparatus with several separator units connected in parallel with a housing.

The separating apparatus illustrated in FIG. 1 has an outer, cubic housing 2, which may be a simple sheet-metal housing and is closed on top by a removable lid 4. In the upper part of a wall 6 of the housing 2 there is a rectangular gas inlet aperture or slot 8 for the crude gas $Q_1$ to be purified. The slot extends over a substantial part of the width of said wall. Below this slot there is a partition 10 parallel to the lid 4 and this partition is provided with rectangular openings in each of which a separator unit 12 is suspended (as will be described hereinafter in more detail). Four such separator units 12 are provided in the illustrated example. However, this number may be larger or smaller. The capacity of the separating apparatus is determined by adding together the capacities of the individual separator units 12.

Purified gas emerges from the separator units 12 through the apertures 14, which are disposed in the broad sides of the separator units and about which further details will be given hereinafter. The individual purified gas flows, which are indicated in FIG. 1 as issuing from two exit apertures by white arrows 16, are conveyed via purified gas outlet connection 18 which is disposed in the bottom 20 of the housing 2 and of which a plurality may be provided. The combined purified gas flow is indicated by the white arrow $Q_3$. In the bottom of the housing 2 there are also pipe connections 24 for the residual gas. Through these pipe connections 24 the residual gas $Q_4$, loaded with the separated solids, is led off as indicated in FIG. 1 by the black arrows 26. The individual pipe connections 24 may be connected to a common residual gas duct.

Figure 2:
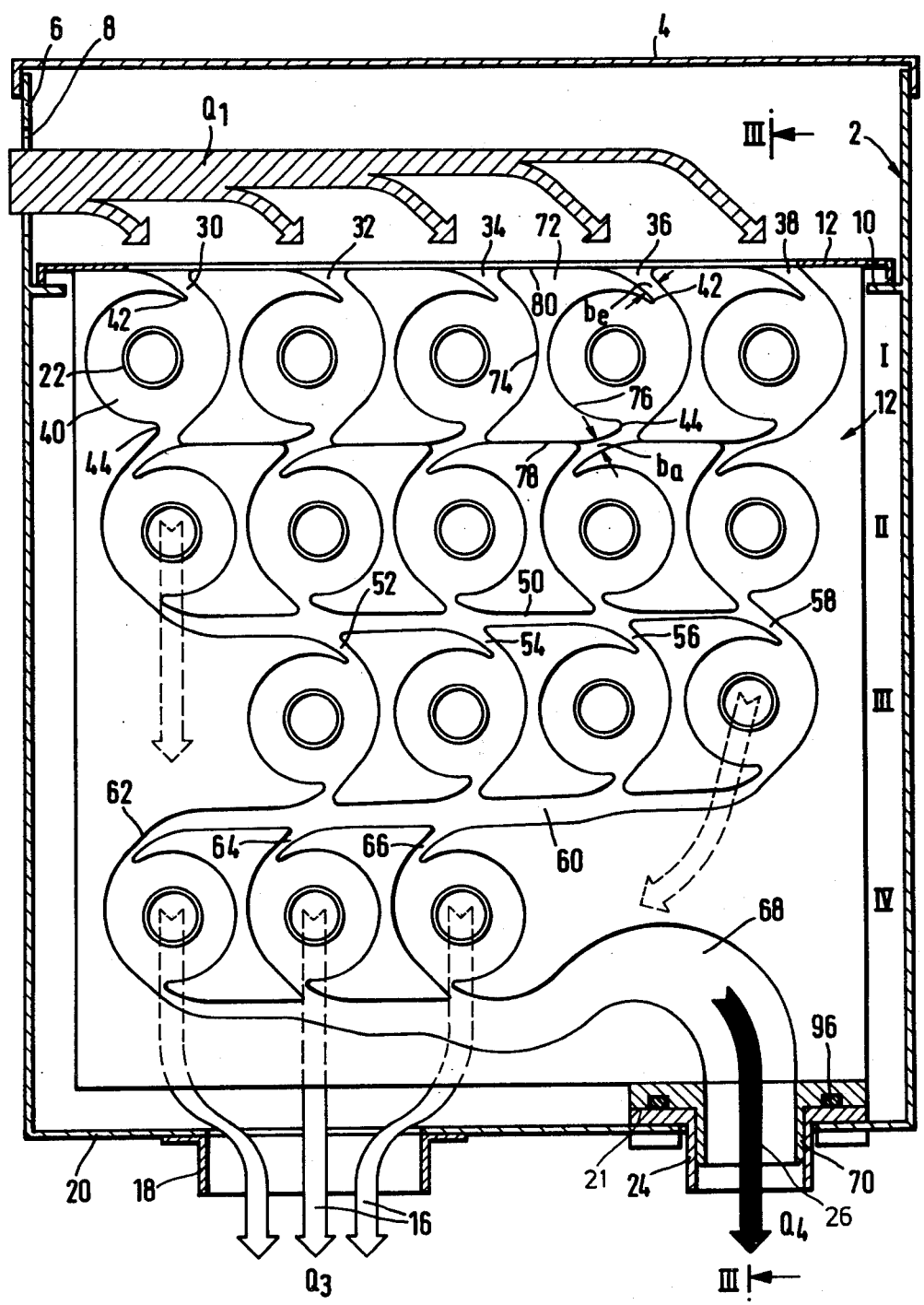
FIG. 2 is a vertical section through the housing and a separator unit.

One of the separator units 12 is illustrated in FIG. 2 as a vertical section. The separator unit has five parallel flow channels 30, 32, 34, 36, 38, open at the one end to the inlet slot. The separation is achieved in four stages I to IV lying in series. The flow channels run in an undulatory manner through the individual separation stages. The individual centrifugal chambers 40 are in each case on the concave sides of the flow channels. Between a trailing edge 42 and a rounded leading edge 44 said centrifugal chambers are open to the flow channels. Two outlet pipes 22 are provided coaxially in each of the centrifugal chambers 40 and these extend towards each other from the planar end walls of the centrifugal chamber 40, as shown in detail in FIG. 3. As a result of the flow in the flow channels a vortex is created, wherein the solids to be separated are driven outwards by centrifugal force, while the purified gas remaining at the centre of the vortex passes out through the outlet pipes 22. The mode of operation of the centrifugal chamber is known and is for instance described in detail in U.S. Pat. No. 4,001,121.

In stages I and II the number of flow channels and therefore of centrifugal chambers is the same. Between stage II and stage III a transverse duct 50 is provided, which distributes the gas volume emerging from the five flow channels of the second stage equally into four flow channels in stage III. These four flow channels 52, 54, 56, 58 lie in a curve which is opposite to the curvature of the flow channels in the Stage II. At the outlet from stage III the flow channels 52, 54, 56, 58 pass into a transverse duct 60 through which the gas volume emerging from the stage III is distributed uniformly into three flow channels 62, 64, 66 of stage IV. The flow channels 62, 64, 66 pass into a common residual gas outlet duct 68 at the outlet of stage IV and this duct discharges into a flanged connection 70 mounted on the lower side of the separator unit 12 and inserted in the pipe connection 24, as is further described with reference to FIG. 3.

The volume of the crude gas flow $Q_1$ to be purified is reduced in the individual stages by the volume of the purified gas flow $Q_3$ emerging from the outlet pipes. The inlet cross-sections of the individual chambers of the succeeding stages (e.g., $b_e$ and $b_a$, respectively, in FIG. 2) must therefore be varied in such a way that approximately the same flow velocities prevail as in the preceding stage.

The number of the centrifugal chambers of each succeeding stage can be smaller in accordance with the diminished flow volume. In this way it is achieved that the volume of the residual crude gas flow from the preceding stage acts on the centrifugal chambers of the following stage with an equal volume of flow and therefore approximately equal flow velocities also occur. This uniform distribution of residual gas flow volume from the preceding to the following stage having a smaller number of centrifugal chambers is made possible by the transverse duct situated between the two stages.

The pure gas volume $Q_3$ issuing through the outlet pipes are shown in FIG. 2 as white, partly-broken arrows, for several of the outlets. A proportionate amount of pure gas emerges from each of the outlet pipes.

The purified gas is conveyed to the consumer through the common purified gas outlet connection 18.

The gas flow through the separating apparatus can be effected on the delivery or the intake side. The crude gas can be conveyed via a blower into the inlet slot 8, to which this blower is connected on its delivery side. Alternatively blowers can be connected with their intake side to both the purified gas outlet 18 and the residual gas outlets 24, respectively.

In the illustrated example, the flow channels and the centrifugal chambers are predominantly formed by structural elements 72, the outer configuration of which corresponds on one side to the boundary 74 of the concave side of the flow channels, while the configuration 76 on the opposite side forms the wall of the centrifugal chamber, including the trailing edge 42 and the leading edge 44 with the section of the concave side of the centrifugal chambers adjacent to them. The structural elements 72 have in addition two parallel boundary surfaces 78, 80.

Between the two stages I and II, the structural elements are situated with their parallel boundary surfaces 78, 80 immediately opposite to each other. By adjustment of the distance apart of the individual structural elements, the width $W_1$ of the inlet cross-section and the width $W_o$ of the outlet cross-section are varied in such a way that even with different volume flows, the same inlet and outlet velocities prevail. The transverse duct between stages II and III, the transverse duct 50, similarly that between stages III and IV, the transverse duct 60, are so designed that the same flow velocity exists in all of the cross-sections and it is ensured that all the centrifugal chambers of a stage receive the same volume of flow.

As can be seen from FIG. 2, the structural elements 72 are bounded mainly by concave surfaces, which results in a very small volume for these elements. This is in turn an indication that the inactive volume of the separator unit is small. The outer boundaries of the exterior flow channels 30 and 38 of stages I and II, also of the channels 52 and 58 of stage III and the channels 66 and 62 of stage IV are shown in FIG. 2 as an integral structural element. These components can also be designed as sections of the structural elements 72. It is then merely necessary to cover the narrow sides and the bottom of the separator unit with a plate, in order to prevent short circuits.

The flat boundary surfaces 78, 80 of the structural elements 72 form, between stages II and III, and III and IV, the boundary walls for the transverse ducts 50 and 60.

Figure 3:
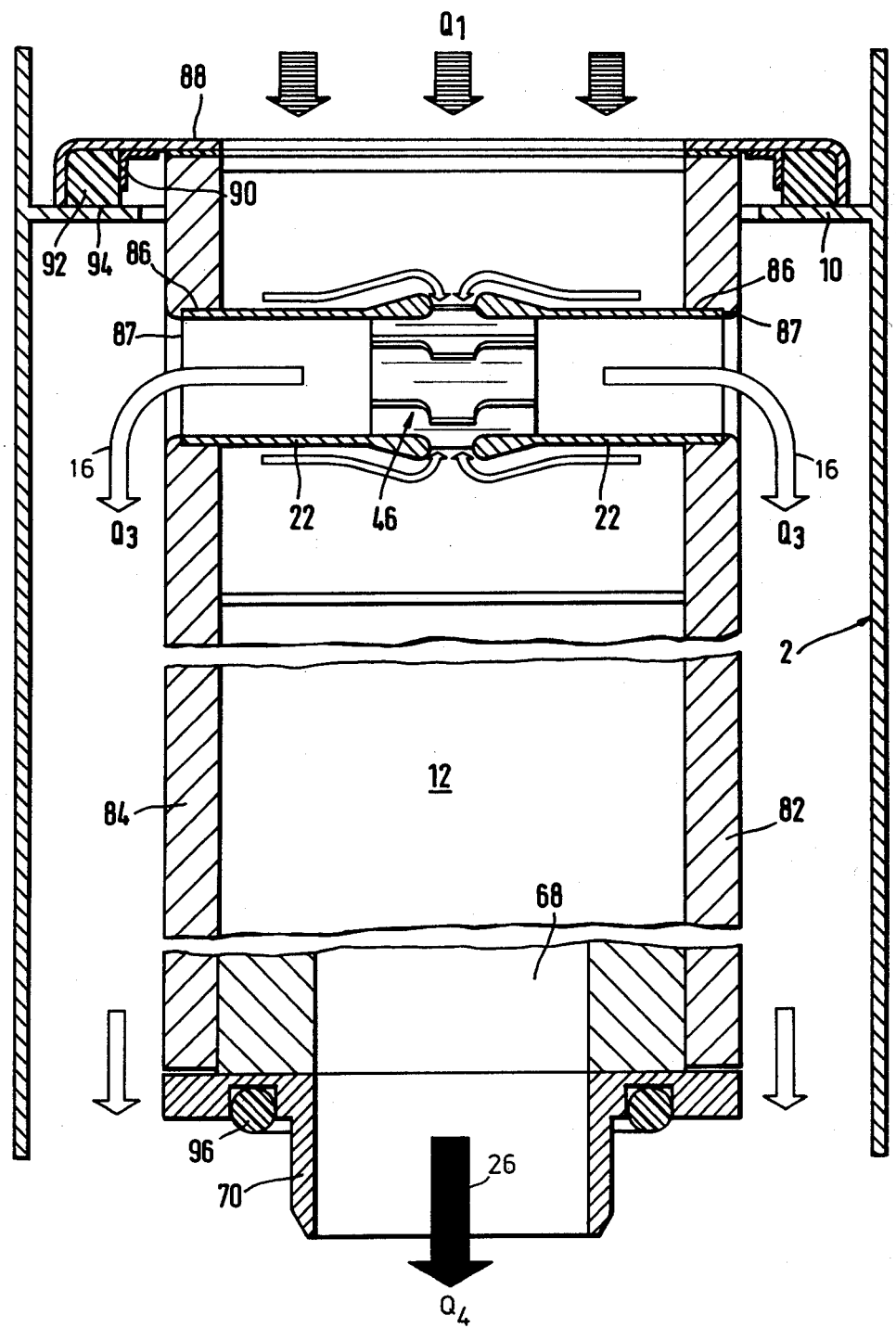
FIG. 3 is to a larger scale, a section along the line III—III in FIG. 2.

The flow channels and the centrifugal chambers are, as can be see from FIG. 3 bounded on their longitudinal sides or ends by two parallel panels 82, 84. The structural elements 72 are joined, preferably screwed, to these panels. The panels 82 and 84 are also provided with holes 86 into which the outlet pipes 22 are inserted. The outlet pipes may for example be cemented, soldered or welded in a recess 87 adjacent to the panels. The holes on the outside of the panels 82 and 84 may be nozzle-like. A distributor 46 is provided between the outlet pipes, as will be described later in more detail with reference to FIGS. 4 to 7.

At their upper ends, the panels 82 and 84 are joined to a rectangular plate 88 forming an outer flange which on its underside, has a U-shaped seal carrier 90 directed downwards, into which a rubber seal 92 is inserted, by which the outer flange is supported on the upper surface 94 of the partition 10 lying transversely in the housing 2. Fixing means provided in order to join the separator units rigidly to the housing.

As is also shown in FIG. 3, the flanged connection 70 is provided on the underside of its flange with a seal 96 which rests tightly against the flange 21 of the pipe connection 24, which flange is adjacent on the inside at the bottom of the housing. An O-ring may also be provided for sealing, in an annular groove on the periphery of the flanged connection 70 or on the inside of the pipe connection 24.

As can be seen from FIG. 3, the outlet pipes 22, directed towards one another, are situated with their ends spaced a distance apart. The purified gas enters the outlet pipes at the intermediate space between the ends of the outlet pipes. For conversion of the rotational energy of the purified gas flow into pressure energy, radial distributors 46 may be arranged, as is shown in FIGS. 4 to 7 in four different embodiments and which are now described.

Figure 4:
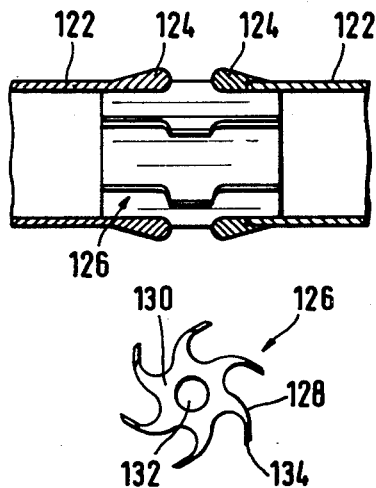
FIGS. 4 to 7 each show a different embodiment in axial cross-section and end views of adjacent inlet ends of two outlet pipes and a distributor for the "untwisting" of the purified gas flow.

In the embodiment shown in FIG. 4, nozzle rings 124 are formed at the inner ends of the outlet pipes 122. For outlet pipes that are fabricated separately and are connected to the centrifugal chamber afterwards, such nozzle rings may, as shown at the left in FIG. 4, be formed integrally with the outlet pipe. Generally it will be advantageous to use a straight pipe section for the outlet pipe and to mount the nozzle rings on the inner end of the outlet pipe. The nozzle rings 124 may be made with high precision by injection moulding or by die casting and may be joined to the outlet pipes by for example cementing.

In FIG. 4 a distributor 126 is disposed between the two outlet pipe ends formed by the nozzle rings. The distributor lies symmetrically with respect to the outlet pipe ends and may extend by a limited distance into them. As can be seen from the end view of the distributor 126 shown in the lower part of FIG. 4, the distributor has curved guide vanes 128 spaced apart at intervals around the periphery, and the vanes originate from a core 130 which is provided with an axial throughway 132. A blank for such a distributor can be made by extrusion or by a continuous casting process. The external diameter of the guide vanes 128 is so chosen that the outer edge or the free end 134 of the guide vanes, as is shown in the upper part of FIG. 4, has a diameter approximately equal to the diameter of the region of closest spacing of the two nozzle rings. Adjoining this section the guide vanes are offset, e.g., bent over according to the internal contour of the nozzle rings and the outlet pipes 122, so that they can be inserted, generally without a gap, with the vanes fitting into the outlet pipe ends. The vane curvature is directed oppositely to the direction of the purified gas flow. The reaction pressure may, for example, be absorbed by inserting the distributor 126 into at least one of the outlet pipes 122 with a press fit. For assembly, each of the distributors 126 is inserted into the outlet pipe on one side, for instance into the outlet pipe on the panel 84. When the chamber is closed by the panel 82, the ends of the outlet pipes which are already on the panel 82 are fitted over the adjacent ends of the distributors 126.

Figure 5:
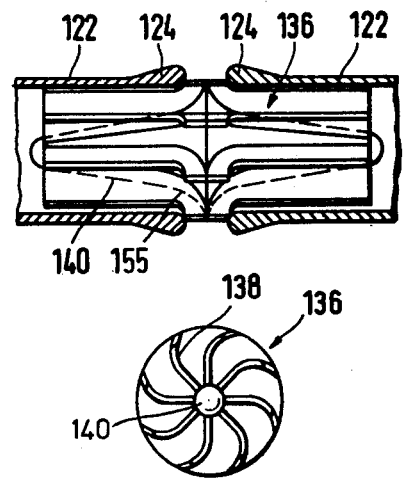

In the embodiment shown in FIG. 5, nozzle rings 124 are disposed on the ends of the outlet pipes 122 and these can be slipped on. The distributor 136 has guide vanes 138 which engage in a similar way in the intermediate space between the nozzle rings and, moreover, are offset, e.g., turned over, according to the diameter of the outlet pipes. In the embodiment shown in FIG. 5, from the intermediate space between the nozzle rings there originate conical guides 140 which pass through the guide vanes and taper into the outlet pipes in the direction of the flow. At their feet, which touch one another, these guides are provided with entrance curves 155. In the end view, (i.e., the lower part of FIG. 5) the rounded point of such a cone 140 can be seen. Distributors as shown in FIG. 5 can be made by injection moulding or by die casting.

Figure 6:
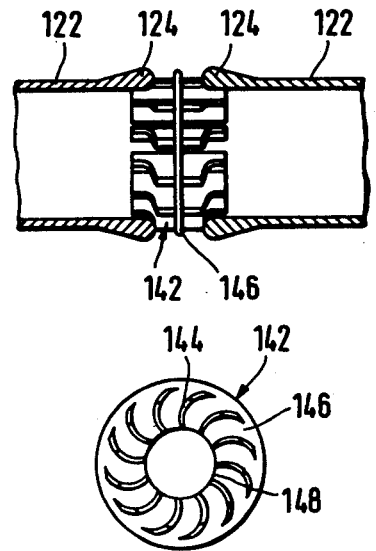

In the embodiment shown in FIG. 6, a distributor 142 is provided which has guide vanes 144 which in the vicinity of the nozzle rings 124 extend into the narrowest cross-section and moreover are matched to the internal contour of the outlet pipe ends.

The blading 144 is disposed on a disc 146 which is centrally situated in the intermediate space between the nozzle rings and extends beyond the outer periphery of the blading. The disc 146 may be provided with an aperture 148 at its centre. Also this kind of distributor may be made by injection moulding or by die casting.

Figure 7:
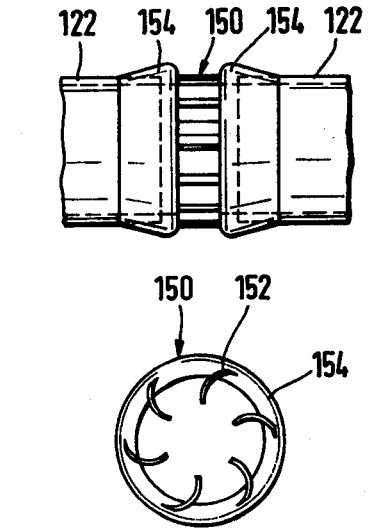

In the embodiment shown in FIG. 7, a distributor 150 is provided having guide vanes 152 which are fixed on one of the nozzle rings 154 which may be attached to the ends of the outlet pipes. In a preferred embodiment, the guide vanes 152 are fixed alternately on one of the two nozzle rings, so that the two nozzle rings together with their vanes produce the overall blading. These nozzle rings may be made by injection moulding or by die casting. It is possible here to fix the guide vanes 152 only in the region of the front of the nozzle rings. They may however be fitted with their fixing edge inside the nozzle ring itself by a limited extent and also extend into the outlet pipe, as in the other embodiments.

The depth of insertion of the blading of the distributor into the ends of the outlet pipes can be chosen according to the prevailing requirements.

By means of the distributors, in accordance with the invention, the rotational energy of the purified gas flow entering the outlet pipes is converted into pressure energy and thereby the pressure drop in the separator unit is reduced. This conversion is realizable without additional structural bulk and therefore with economy of space. Moreover the production cost of the distributors is relatively low.

What I claim as my invention and desire to secure by Letters Patent of the United States is:

1. A separating apparatus for separating solids suspended in a gas stream by means of centrifugal force, the apparatus comprising a housing with an inlet aperture for the crude gas, at least one separator unit disposed within said housing and including
   (a) a pair of end panels,
   (b) a first set of parallel flow channels open to said inlet aperture at one end,
   (c) a plurality of cylindrical centrifugal chambers, each of which adjoins a flow channel and has a trailing edge and a leading edge and between these edges is open to said flow channel, said first set of flow channels and centrifugal chambers defining a first separator stage,
   (d) additional sets of flow channels and centrifugal chambers arranged downstream of said first separator stage so as to define a plurality of sequential separator stages from said first separator stage to a last separator stage, such that in successive separator stages in the direction of flow of the gas stream the total number of said flow channels and the total number of said centrifugal chambers in some of said stages decreases, all of said flow channels and centrifugal chambers being bounded by said end panels,
   (e) a transverse duct located between each pair of adjacent separator stages having different numbers of said parallel flow channels and centrifugal chambers, each such transverse duct joining together said sets of parallel flow channels such that the centrifugal chambers in the separator stage located downstream of such transverse duct are acted on uniformly by the gas stream, the transverse duct downstream of the last stage being connected to a residual gas outlet channel adapted to receive the residual gas from the set of parallel flow channels in said last stage, (f) two outlet pipes disposed coaxially in each of said centrifugal chambers, said outlet pipes extending towards each other from said end panels, and (g) flange means joined to said end panels and disposed about the open ends of said first set of parallel flow channels, said housing further comprising (1) a disposed partition within said housing and located downstream of said inlet aperture and having at least one opening for receiving said at least one separator unit, the flange means of said at least one separator unit sealingly coacting with said partition about said opening, (2) two opposite walls spaced from the end panels of said at least one separator unit, (3) a purified gas outlet communicating with said outlet pipes, and (4) a residual gas outlet to which said residual gas outlet channel of said at least one separator unit is sealingly connected.

2. A separating apparatus as claimed in claim 1 in which the configurations of all said centrifugal chambers in said at least one separator unit are substantially identical in cross-section.

3. A separating apparatus as claimed in claim 1 in which said at least one separator unit further includes a plurality of adjacent substantially identical structural elements, each disposed and configured in relation to the adjacent structural elements so as to define intervening spaces forming said flow channels and said centrifugal chambers.

4. A separating apparatus as claimed in claim 3 wherein said structural elements are disposed between said end panels.

5. A separating apparatus as claimed in claim 1 in which a plurality of spaced separator units are situated within said housing with their end panels substantially parallel to each other, and wherein said at least one opening comprises one opening for each separator unit of said plurality of separator units, and wherein said housing further includes a residual gas outlet for each separator unit sealingly connected to the residual gas outlet channel of each separator unit of said plurality of separator units.

* * * * *